US006691955B2

(12) United States Patent
Reckdahl et al.

(10) Patent No.: US 6,691,955 B2
(45) Date of Patent: Feb. 17, 2004

(54) SPACECRAFT HAVING A MOMENTUM WHEEL CONFIGURATION THAT PREVENTS ZERO WHEEL SPEEDS

(75) Inventors: Keith Reckdahl, Palo Alto, CA (US); Xenophon Price, Redwood City, CA (US)

(73) Assignee: Space Systems/Loral, Palo Alto, CA (US)

( * ) Notice: Subject to any disclaimer, the term of this patent is extended or adjusted under 35 U.S.C. 154(b) by 211 days.

(21) Appl. No.: 09/995,017

(22) Filed: Nov. 27, 2001

(65) Prior Publication Data

US 2003/0098393 A1 May 29, 2003

(51) Int. Cl.⁷ ................................................. B64G 1/28
(52) U.S. Cl. ..................................................... 244/165
(58) Field of Search ................................ 244/165, 164, 244/158 R; 701/13

(56) References Cited

U.S. PATENT DOCUMENTS

| | | | | |
|---|---|---|---|---|
| 3,452,948 A | * | 7/1969 | Kukel et al. | |
| 3,999,729 A | * | 12/1976 | Muhlfelder et al. | |
| 4,071,211 A | * | 1/1978 | Muhlfelder et al. | |
| 5,058,835 A | * | 10/1991 | Goodzeit et al. | |
| 5,931,421 A | * | 8/1999 | Surauer et al. | |
| 6,138,953 A | * | 10/2000 | Noyola et al. | |
| 6,285,928 B1 | * | 9/2001 | Tilley et al. | |
| 6,305,647 B1 | * | 10/2001 | Defendini et al. | |
| 6,443,398 B2 | * | 9/2002 | Dargent et al. | |

FOREIGN PATENT DOCUMENTS

| | | | | |
|---|---|---|---|---|
| EP | 493143 | * | 7/1992 | ............... 244/165 |
| GB | 2211937 | * | 7/1989 | ............... 244/165 |

* cited by examiner

*Primary Examiner*—Tien Dinh
(74) *Attorney, Agent, or Firm*—Kenneth W. Float

(57) ABSTRACT

A momentum wheel configuration that may be used on a spacecraft having a momentum bias that prevents zero wheel speeds. The momentum wheel configuration comprises three or more momentum wheels. The momentum wheels are oriented such that their wheel axes are not parallel to each other. The momentum wheels are oriented such that their axial momentum vectors are not coplanar. None of the momentum wheels have their wheel axis parallel to the momentum bias direction of the spacecraft. No two of the momentum wheels are oriented such that their axial momentum vectors are coplanar with the momentum bias direction of the spacecraft.

12 Claims, 2 Drawing Sheets

SPACECRAFT HAVING A MOMENTUM WHEEL CONFIGURATION THAT PREVENTS ZERO WHEEL SPEEDS

BACKGROUND

The present invention relates generally to spacecraft, and more particularly, to spacecraft having a momentum wheel configurations and spacecraft employing same that prevents zero wheel speeds.

For a spacecraft having three-axis momentum wheel storage, the most basic momentum wheel arrangement is the use of three wheels that are disposed parallel to roll, pitch, and yaw axes of the spacecraft. While this provides three-axis momentum storage, it does not provide redundancy to protect against wheel failure.

To add redundancy, U.S. Pat. No. 3,999,729 teaches modifying the basic three orthogonal momentum wheel configuration and adds a fourth skew wheel that may be used as a replacement wheel in the event of failure of any of the three primary wheels. Another common wheel configuration is to arrange four wheels in a pyramidal configuration.

However, when the above described momentum wheel configurations are used to provide three-axis momentum storage with 4-for-3 redundancy, the momentum wheels may change rotational directions, thus causing the wheels to stop rotating for an instant.

These zero wheel speeds cause three problems. First, stiction (static friction) that occurs at zero wheel speed is uncertain, which may result in a spacecraft pointing error. Second, the distribution of bearing lubrication used to lubricate bearings of the momentum wheels may be less effective at low speeds, causing insufficient lubrication and reduced bearing life. Third, a tachometer used for sensing wheel speed is less effective at low speeds.

It would be therefore be advantageous to have momentum wheel configurations for use on a spacecraft that prevents zero wheel speeds, and spacecraft such momentum wheel configurations.

SUMMARY OF THE INVENTION

The present invention comprises a momentum wheel configuration that may be used on a spacecraft having a momentum bias that prevents zero wheel speeds. The present invention produces a momentum configuration that provides a momentum bias and three-axis momentum storage without causing the momentum wheels to experience zero wheel speeds.

More particularly, the present invention is a momentum wheel configuration for use with a spacecraft having a momentum bias and that comprises three or more momentum wheels. The momentum wheels are oriented such that their wheel axes are not parallel to each other. The momentum wheels are oriented such that their axial momentum vectors are not coplanar. None of the momentum wheels have their wheel axis parallel to the momentum bias direction of the spacecraft. No two of the momentum wheels are oriented such that their axial momentum vectors are coplanar with the momentum bias direction of the spacecraft.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
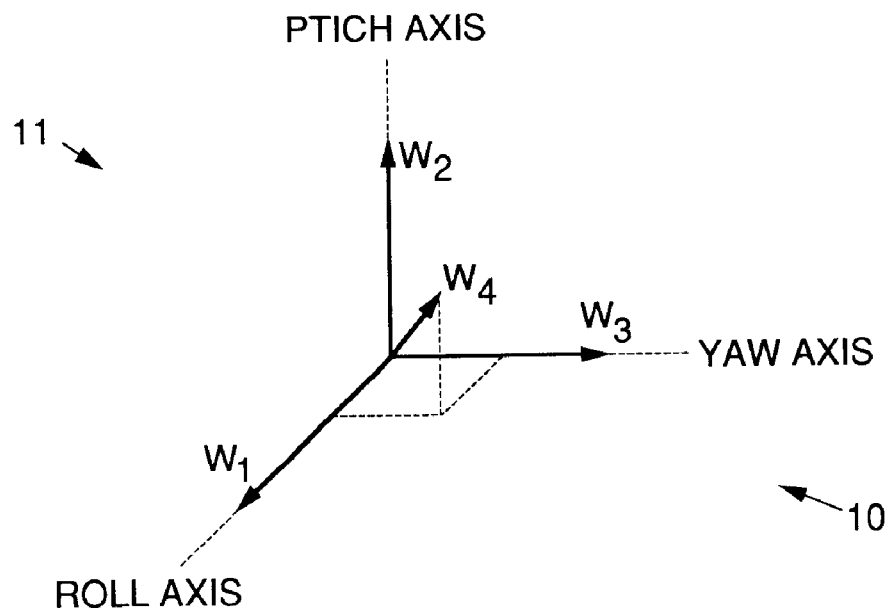
FIG. 1 illustrates a conventional three-axis momentum wheel configuration having 4-for-3 redundancy.

Referring to the drawing figures, FIG. 1 illustrates a conventional three-axis momentum wheel configuration 10 for use with a spacecraft 11 having 4-for-3 redundancy. This momentum wheel configuration 10 is described in U.S. Pat. No. 3,999,729. This momentum wheel configuration 10 is a modification of a basic momentum wheel arrangement having three momentum wheels parallel to roll, pitch, and yaw axes of the spacecraft 11. A fourth skew wheel is added to the basic momentum wheel arrangement that have the momentum wheels parallel to roll, pitch, and yaw axes (illustrated by the arrows along the respective axes).

Figure 2:
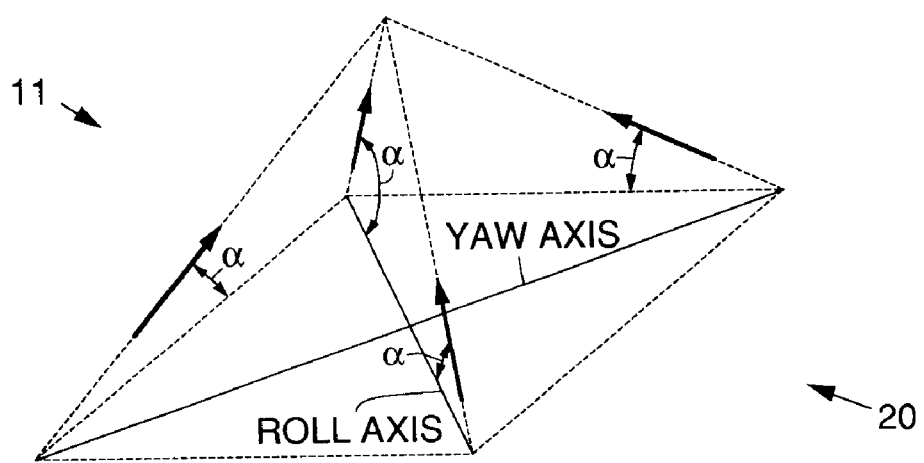
FIG. 2 illustrates a conventional pyramidal three-axis momentum wheel configuration having 4-for-3 redundancy.

FIG. 2 illustrates a conventional pyramidal three-axis momentum wheel configuration 20 for use with a spacecraft 11 having 4-for-3 redundancy. The four momentum wheels are oriented along lines that correspond to intersections between adjacent faces of a pyramid (illustrated by the arrows along the boundaries between the adjacent faces of a pyramid).

However, as was mentioned above, when the momentum wheel configurations 10, 20 shown in FIGS. 1 and 2 are used to provide three-axis momentum storage with 4-for-3 redundancy, the momentum wheels may change directions, causing the wheels to stop rotating for an instant. The problems discussed in the Background section are a result.

When the spacecraft 11 has a momentum bias, the present invention prevents these problems from occurring by preventing zero momentum wheel speeds. This is accomplished by ensuring that the momentum wheels do not change directions. The present invention requires a momentum wheel configuration that satisfies the following constraints.

(1) No two momentum wheels can have parallel axes.

(2) No three momentum wheels can be oriented such that their axial momentum vectors are coplanar. For example, if $\vec{W}_1$, $\vec{W}_2$ and $\vec{W}_3$ are momentum vectors parallel to the axis of three momentum wheels (#1, #2, and #3 respectively), then the three momentum vectors cannot be coplanar, requiring the scalar triple product $\vec{W}_1 \times \vec{W}_2 \cdot \vec{W}_3$ to be non-zero.

(3) No momentum wheel can have its axis parallel to the momentum bias direction of the spacecraft 11.

(4) No two momentum wheels can be oriented such that their axial momentum vectors and the bias direction are coplanar. For example, if $\vec{b}$ is a vector parallel to the momentum bias direction and $\vec{W}_1$ and $\vec{W}_2$ are momentum vectors parallel to the axis of two momentum wheels (#1, and #2, respectively), then the three vectors $\vec{b}$, $\vec{W}_1$ and $\vec{W}_2$ cannot be coplanar, requiring the scalar triple product $\vec{W}_1 \times \vec{W}_2 \cdot \vec{b}$ to be non-zero.

The first two constraints are required in order to ensure that any three-wheel combination provides three-axis momentum storage, while the last two constraints are required to prevent zero-speed crossings. Note that the momentum wheel configuration shown in FIG. 1 violates design constraint (3) and the pyramidal wheel configuration in FIG. 2 violates design constraint (4).

Figure 3:
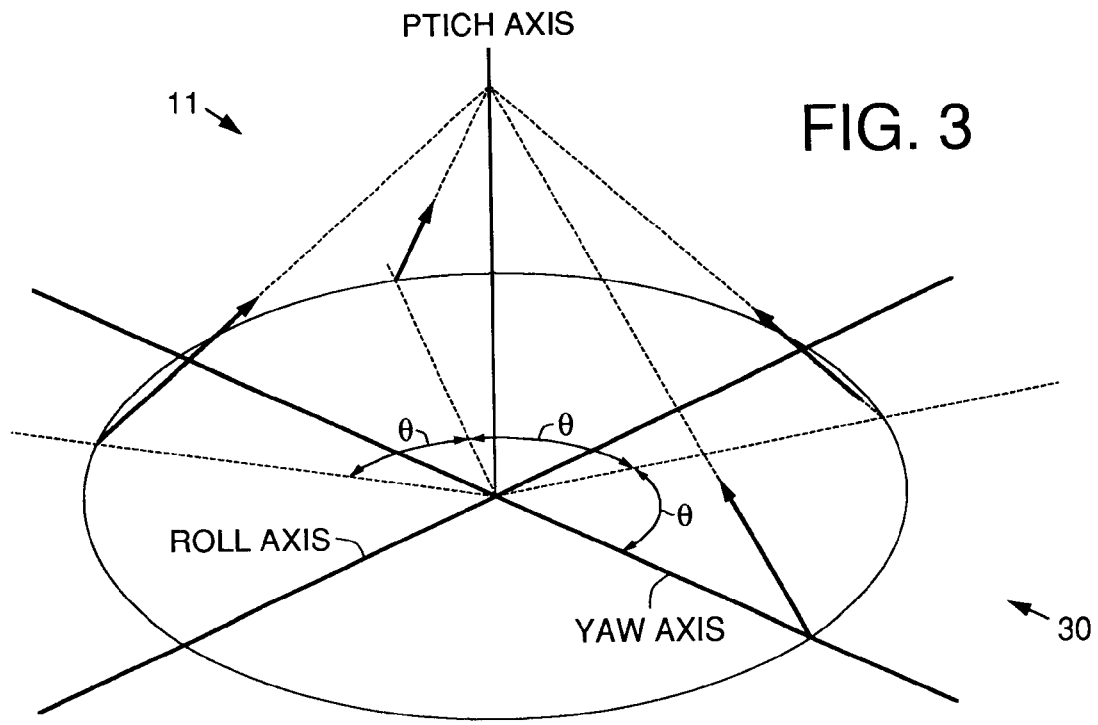
FIG. 3 illustrates a first exemplary momentum wheel configuration in accordance with the principles of the present invention.

A first exemplary momentum wheel configuration 30 in accordance with the principles of the present invention for use with a spacecraft 11 having a momentum bias that satisfies all four design constraints is shown in FIG. 3. Looking at a top view of the momentum wheel configuration 30 shown in FIG. 3, wheel axes are angularly separated by an angle θ (where θ≠90°), and each wheel axis makes an angle α with the roll-yaw plane.

To summarize the present invention, it is a momentum wheel configuration 30 for use with a spacecraft 11 having a momentum bias and that comprises three or more momentum wheels. The momentum wheels are oriented such that their wheel axes are not parallel to each other. The momentum wheels are oriented such that their axial momentum vectors are not coplanar. None of the momentum wheels have their wheel axis parallel to the momentum bias direction of the spacecraft. No two of the momentum wheels are oriented such that their axial momentum vectors are coplanar with the momentum bias direction of the spacecraft 11.

To demonstrate the principles of the present invention, the pyramidal momentum wheel configuration 20 of FIG. 2 and the momentum wheel configuration 30 of FIG. 3 (with θ=72 degrees) were optimized to supply 50 Nms of pitch bias while also providing storage of an additional 5 Nms of momentum in any direction. When using 0.108 kg*M² momentum wheels, the pyramidal configuration 20 of FIG. 2 produces wheel speeds ranging from −979 RPM to 3207 RPM, while the momentum wheel configuration 30 in accordance with the present invention produced wheel speeds ranging from 500 RPM to 4527 RPM. Although the present momentum wheel configuration 30 experiences larger wheel speeds, it prevents any zero wheel speeds from occurring and hence eliminates the above-mentioned problems.

Figure 4:
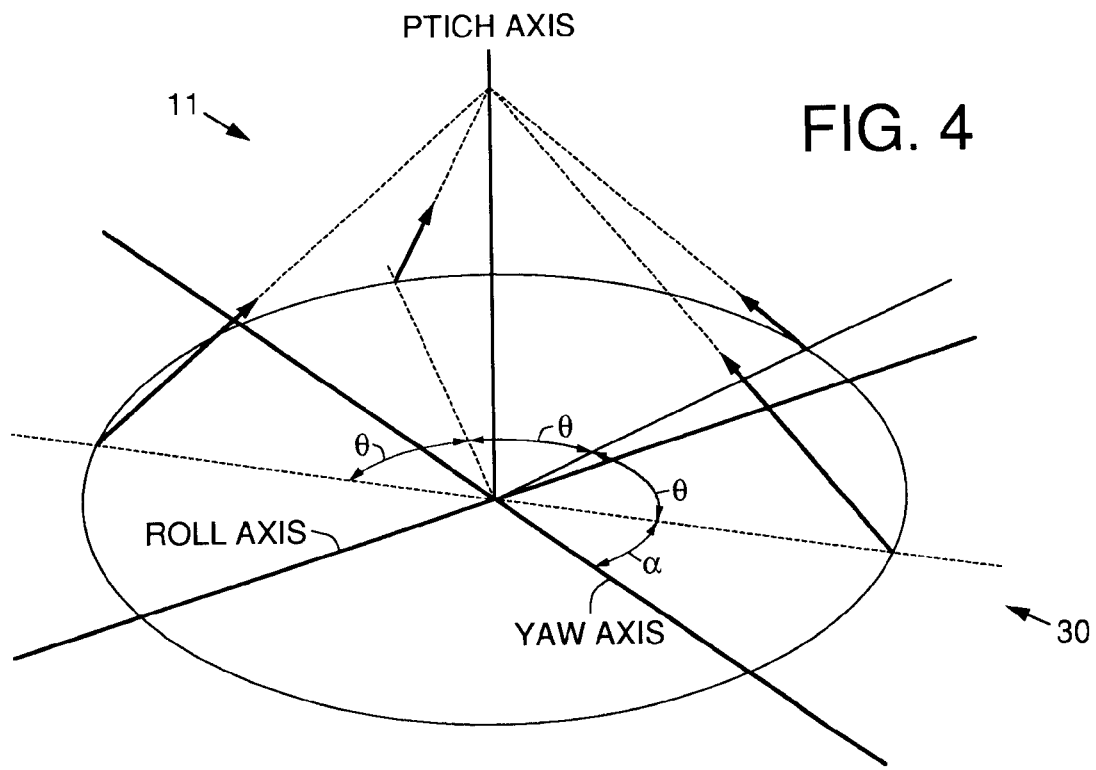
FIG. 4 illustrates a second exemplary momentum wheel configuration in accordance with the principles of the present invention.

Once the wheel configuration is design to maximize momentum storage and/or minimize wheel speed reversals, the wheel configuration can be further optimized to produce maximum torque about certain axes. For example, it is desirable for the wheel configuration to produce maximum torque about the directions that the spacecraft performs unloads. Since the wheel configuration in FIG. 3 was designed to produce equal momentum storage about all lines in the Roll/Yaw plane, the entire wheel configuration can be rotated about the Pitch Axis (without changing the relative orientation of the wheel axes). FIG. 4 shows the wheel configuration rotated by an angle α. This free parameter α can be used to optimize the configuration to provide maximum torque about one or more directions in the roll/yaw plane, such as the roll axis or the yaw axis.

It has been found that this optimization is equivalent to maximizing the minimum angle between the cross product of any two wheel axes and the preferred direction(s). If $\vec{W}_1$, $\vec{W}_2$ and $\vec{W}_3$ are vectors parallel to the axis of three momentum wheels (#1, #2, and #3, respectively), the torque $T_1$ required of wheel #1 to produce a torque $\vec{T}$ is given by $T_1 = (\vec{T} \cdot \vec{W}_2 \times \vec{W}_3)/(\vec{W}_1 \cdot \vec{W}_2 \times \vec{W}_3)$. Since the denominator is only a function of the relative axis orientations, the denominator is not affected by a rotation of the entire wheel configuration. If $\vec{W}_2 \times \vec{W}_3$ is perpendicular to $\vec{T}$ then wheel #1 is not required to produce any torque in order for the entire wheel system to produce a torque $\vec{T}$. Conversely, if $\vec{W}_2 \times \vec{W}_3$ is parallel to $\vec{T}$ then wheel #1 will have to a very large torque in order for the entire wheel system to produce a torque $\vec{T}$. Obviously, it is not possible for all the two-wheel combinations to have their cross products perpendicular to $\vec{T}$, but the optimal configuration has minimizes the angles between the two-wheel cross products and the preferred directions. Since the maximum angle corresponds to the wheel whose torque limitation will be reached first, it is important to minimize the maximum angle between the preferred direction and the cross products of any two wheel axes. When the preferred directions are the spacecraft axes, none of the wheels are coplanar with any two spacecraft axes.

For example, when the configuration in FIG. 4 has θ=90 degrees and α=0 degrees, the wheel system can produce a maximum pure yaw torque of $T_Z = T_{MAX}*\sin(el)$, where $T_{MAX}$ is the maximum wheel torque and $el$ is the angle between the pitch axis and the wheel axes. However, by examining the two-wheel cross products, one can determine that the optimal wheel configuration has an angle α=45 degrees which produces a maximum pure yaw torque of $T_Z = \sqrt{2}*T_{MAX}*\sin(el)$, which is more than 40% more torque with the same hardware. Similarly, the wheel configuration with θ=72 degrees also can be rotated from α=45 to α=45 to increase the maximum yaw torque from $T_Z = 0.7265*T_{MAX}*\sin(el)$ to $T_Z = 1.1755*T_{MAX}*\sin(el)$, an increase of over 60%.

The present invention may be used in conjunction with spacecraft employing any momentum wheel configuration that provides three-axis momentum storage. The present invention may also be used with a set of three momentum wheels having no redundancy, or a set of four momentum wheels having 4-for-3 redundancy, or a set of N momentum wheels providing N-for-3 redundancy, for example.

Thus, momentum wheel configurations for use on a spacecraft that prevents zero momentum wheel speeds has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A momentum wheel configuration for use with a spacecraft having a momentum bias, comprising:

three or more momentum wheels arranged such that their wheel axes are not parallel to each other, such that no three of the wheels have coplanar axes, such that none of the momentum wheels have their wheel axis parallel to the momentum bias direction of the spacecraft, and such that no two momentum wheels are oriented such that their axial momentum vectors are coplanar with the momentum bias direction of the spacecraft.

2. The configuration recited in claim 1 which is rotated about the spacecraft momentum bias direction by an angle that maximizes the minimum angle between the cross product of any two wheel axes and a preferred direction about which maximum torque is desired.

3. The configuration recited in claim 2 wherein the preferred direction is the spacecraft roll axis.

4. The configuration recited in claim 2 wherein the preferred direction is the spacecraft yaw axis.

5. A momentum wheel configuration for use with a spacecraft, comprising:

three or more momentum wheels arranged to maximize the minimum angle between the cross product of any two wheel axes and a preferred direction about which maximum torque is desired.

6. A momentum wheel configuration for use with a spacecraft, comprising:

three or more momentum wheels arranged such that no momentum wheel is coplanar with any two spacecraft axes.

7. Apparatus comprising:

a spacecraft having a momentum bias; and a momentum wheel configuration comprising three or more momentum wheels arranged such that no momentum wheel is coplanar with any two spacecraft axes.

8. The apparatus recited in claim 7 wherein the momentum wheel configuration comprises three or more momentum wheels arranged to maximize the minimum angle between the cross product of any two wheel axes and a preferred direction about which maximum torque is desired.

9. The apparatus recited in claim 7 wherein the momentum wheel configuration comprises three or more momentum wheels arranged such that their wheel axes are not parallel to each other, such that no three of the wheels have coplanar axes, such that none of the momentum wheels have their wheel axis parallel to the momentum bias direction of the spacecraft, and such that no two momentum wheels are oriented such that their axial momentum vectors are coplanar with the momentum bias direction of the spacecraft.

10. The apparatus recited in claim 9 which is rotated about the spacecraft momentum bias direction by an angle that maximizes the minimum angle between the cross product of any two wheel axes and a preferred direction about which maximum torque is desired.

11. The apparatus recited in claim 10 wherein the preferred direction is the spacecraft roll axis.

12. The apparatus recited in claim 10 wherein the preferred direction is the spacecraft yaw axis.

* * * * *